UNITED STATES PATENT OFFICE.

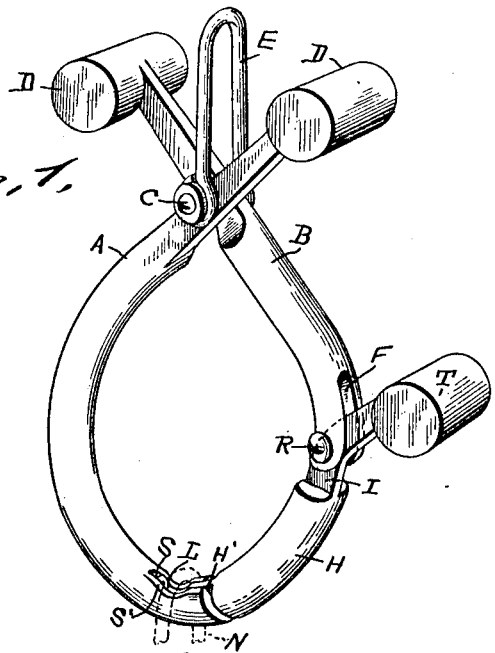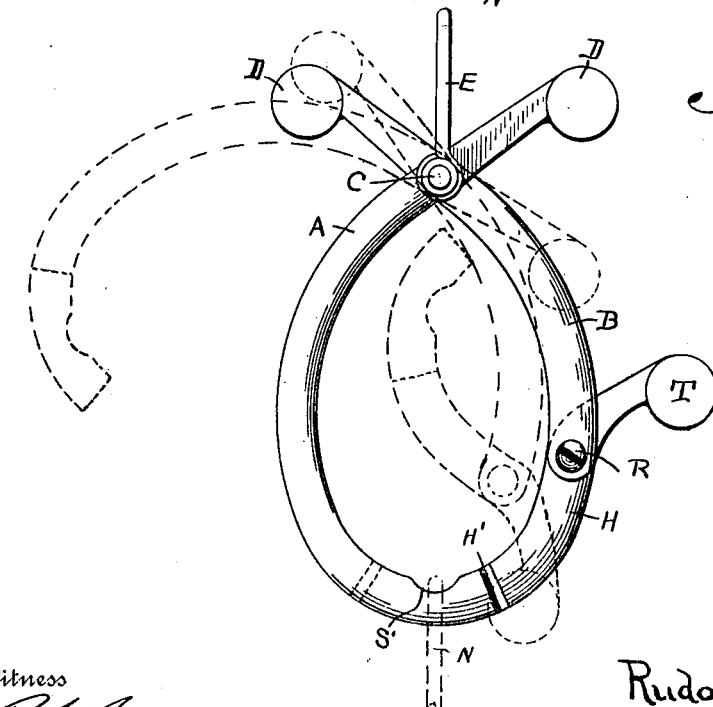

RUDOLF NELLES, OF BALTIMORE, MARYLAND.

RELEASING-HOOK FOR BOATS, &c.

1,273,650.  Specification of Letters Patent.  Patented July 23, 1918.

Application filed April 20, 1918. Serial No. 229,727.

*To all whom it may concern:*

Be it known that I, RUDOLF NELLES, a subject of the King of England, residing at Baltimore, State of Maryland, has invented certain new and useful Improvements in Releasing-Hooks for Boats, &c., of which the following is a specification, reference being had therein to the accompanying drawing.

This invention relates to new and useful improvements in automatic releasing hooks designed especially for use in lowering and releasing life boats upon ships, etc., and consists essentially of pivotal weighted hook sections adapted to be engaged and held together by a link or other connection and supporting a weight, and when the sections are released from the weight of the article are adapted to become disconnected from said article.

The invention comprises further various details of construction, combinations and arrangements of parts which will be hereinafter fully described, shown in the accompanying drawings and then specifically defined in the appended claims.

My invention is illustrated in the accompanying drawings which, with the letters of reference marked thereon, form a part of this application and in which:

Figure 1 is a perspective view of the automatic releasing hook closed, and

Fig. 2 is a side elevation showing the hook in solid lines connected together, and in dotted lines in released relation.

Reference now being had to the details of the drawings by letter:—

A and B designate two sections which are pivoted together by means of a pin C and the upper end of each section terminates in a weighted portion D. A staple-shaped member E is pivotally mounted upon the pin C and forms a means whereby the device may be supported. One of said sections B, which is shorter than the other, has a slot F formed at one end, and H is a gravity hook section having a contracted portion I which is pivotally mounted upon a pin R passing through registering apertures in the walls of the slot F. One end of said contracted portion terminates in a weighted member T. The meeting ends of the section A is slotted as at S to receive the contracted extension H' of the hook section H, and the upper edge of said contracted extension H' is recessed as at L and the upper edges of the walls of the slot S are provided with oppositely disposed recesses S', which register with the recess L when the hook sections are together in the position shown in Figs. 1 and 2 of the drawings. A link N which is adapted to be fastened securely to a boat or other object, is adapted to rest in the registering grooves in the manner shown in dotted lines in the drawings, the weight of the object to which the link is connected being sufficient to hold the parts together in the manner shown in solid lines in Figs. 1 and 2 of the drawings.

In operation, when the device is used in connection with lowering a life boat, in connection with which the device is especially adapted for use, the lower ends of the releasing device will be held together by the link N, which is adapted to be fastened to the boat, and when the latter is lowered and comes in contact with the surface of the water, the link N will be relieved of the weight of the boat and the lower connected ends of the parts A and H will draw apart through the medium of the weights at the ends thereof and when the releasing device is raised, the link N which is caught over the grooved end of the part H, will draw out of the link and the parts will be thrown by gravity to the position shown in dotted lines in Fig. 2 of the drawings.

By the provision of a releasing device embodying the features of my invention, it will be noted that a safety means is afforded and which is especially adapted for use in lowering life boats where it is desired to have the hook disconnected automatically when the weight of the boat is relieved from the hook sections The device will also be found useful for lowering objects of any kind and operated automatically, as set forth.

What I claim to be new is:

1. A releasing device for life boats, etc., consisting of two sections pivoted together and provided each with a weighted upper end, a weighted hook member pivotally mounted upon one of said sections and adapted to interlock with the other of said sections, and a link for attachment to a weighted object to be lowered, and serving to hold the interlocking parts together when supporting the weighted object.

2. A releasing hook for life boats, consisting of two sections pivoted together and provided with weighted portions at their upper ends, supporting means connected to the pivot between the sections, one of the latter having a slotted end, a hook section provided with a contracted shank portion pivotally mounted in said slot and terminating at its upper end in a weighted portion, the free end of the hook section being contracted and designed to interlock with the slot in the end of the other of said sections, the upper edges of the interlocking parts being transversely grooved, adapted to be engaged by the link for supporting a weighted object.

In testimony whereof I hereunto affix my signature in presence of a witness.

RUDOLF NELLES.

Witness:
A. L. HOUGH.